United States Patent [19]

Nagase et al.

[11] 4,330,741
[45] May 18, 1982

[54] ELECTRIC CONTROL APPARATUS OF INDUCTION MOTOR

[75] Inventors: Hiroshi Nagase, Hitachi; Toshiaki Okuyama, Tokai; Yuzuru Kubota, Hitachi; Katsunori Suzuki, Ibaraki, all of Japan

[73] Assignee: Hitachi, Ltd., Tokyo, Japan

[21] Appl. No.: 158,390

[22] Filed: Jun. 11, 1980

[30] Foreign Application Priority Data

Jun. 20, 1979 [JP] Japan .................................. 54-76822
Nov. 12, 1979 [JP] Japan .................................. 54-145529

[51] Int. Cl.³ ............................................. H02P 5/40
[52] U.S. Cl. .................................. 318/803; 318/808; 318/809
[58] Field of Search ............................. 318/798–803, 318/807–811

[56] References Cited

U.S. PATENT DOCUMENTS

| | | | |
|---|---|---|---|
| 3,983,463 | 9/1976 | Nabae et al. | 318/803 |
| 4,158,163 | 6/1979 | Eriksen et al. | 318/798 |
| 4,207,510 | 6/1980 | Woodbury | 318/811 |

*Primary Examiner*—David Smith, Jr.
*Attorney, Agent, or Firm*—Craig and Antonelli

[57] ABSTRACT

An electric control apparatus of an induction motor is provided with a flux current controller for controlling the flux current of the motor and a secondary current controller for controlling the secondary current of the motor. A pulse generator circuit is disposed to control the amplitude, frequency and phase angle of the primary current of the motor according to output signals of the flux current controller and secondary current controller. The primary voltage and frequency to be applied to the motor are controlled by pulse signals from the pulse generator circuit. This pulse generator circuit includes a primary voltage setting zone for setting the primary voltage of the induction motor and a primary voltage detecting zone for detecting the primary voltage of the motor. A voltage regulator is disposed to put out a signal equivalent to the change of the secondary resistance of the induction motor according to the deviation of the voltage between the primary voltage detecting zone and the primary voltage setting zone. A correcting controlling zone is disposed in the pulse generator circuit to perform a controlling action of correcting the frequency, which is one of the control objects of the pulse generator circuit, according to the output signal of the voltage regulator.

12 Claims, 9 Drawing Figures

ELECTRIC CONTROL APPARATUS OF INDUCTION MOTOR

BACKGROUND OF THE INVENTION (1) Field of the Invention

The present invention relates to an improvement in an electric control apparatus of a cage type induction motor.

(2) Description of the Prior Art

Recently, there has been developed and utilized an electric control apparatus for an induction motor, that is a so-called field oriented control apparatus, in which the exciting current and the secondary current are independently controlled to control the amplitude, frequency and phase angle of the primary current, whereby the generating torque is adjusted. According to this control apparatus, the exciting current of the induction motor and the secondary current, which has a direct relation to speed control of the induction motor, can be controlled independently, and therefore, the speed response characteristic of the induction motor can be improved to a level comparable to that of a DC motor.

As an example of the field oriented control apparatus of this type, reference can be made, for example, to the constant flux and slip frequency control type vector control apparatus shown in FIG. 6 attached to the treatise entitled "Speed Control of Induction Motor" which was published at the symposium of the national meeting of the Japanese Electric Association in April 1979.

This known field oriented control apparatus still involves the following problem.

The resistance value of a secondary resistor of a cage type induction motor is remarkably influenced by such factors as the load and the ambient temperature. If the resistance value of the secondary resistor is considerably changed, as described hereinafter, the slip frequency of the induction motor is not controlled to a correct value proportional to the secondary current preset by the vector control apparatus, with the result that problems relating to variations in the voltage and torque are brought about in the induction motor.

SUMMARY OF THE INVENTION

It is therefore a primary object of the present invention to provide a control apparatus for an induction motor, in which even if the secondary resistance of the induction motor is changed, the primary voltage and torque of the induction motor can be prevented from being changed.

Another object of the present invention is to provide a control apparatus for an induction motor, by which the induction motor can be operated very stably from a low speed while eliminating undesirable influences due to changes in the resistance value of the secondary resistance.

It was noted that as pointed out hereinafter, the exciting current of the induction motor is changed with changes in the secondary resistance of the induction motor, resulting in changes of the primary voltage and torque of the induction motor, and we have now completed the present invention based on researches made on interrelations among these changes.

In accordance with the present invention, the foregoing objects can be attained by a control apparatus which is arranged so that, as described hereinafter, the quantity of the change of the secondary resistance of the inductive motor is detected from the deviation values of outputs from a primary voltage setter and a primary voltage detector and the slip frequency is corrected according to the deviation values. According to this control apparatus for an induction motor, the primary voltage and torque of the induction motor are not all with changes in the secondary resistance of the induction motor.

DETAILED DESCRIPTION OF THE PREFERRED EMBODIMENTS

Figure 3:
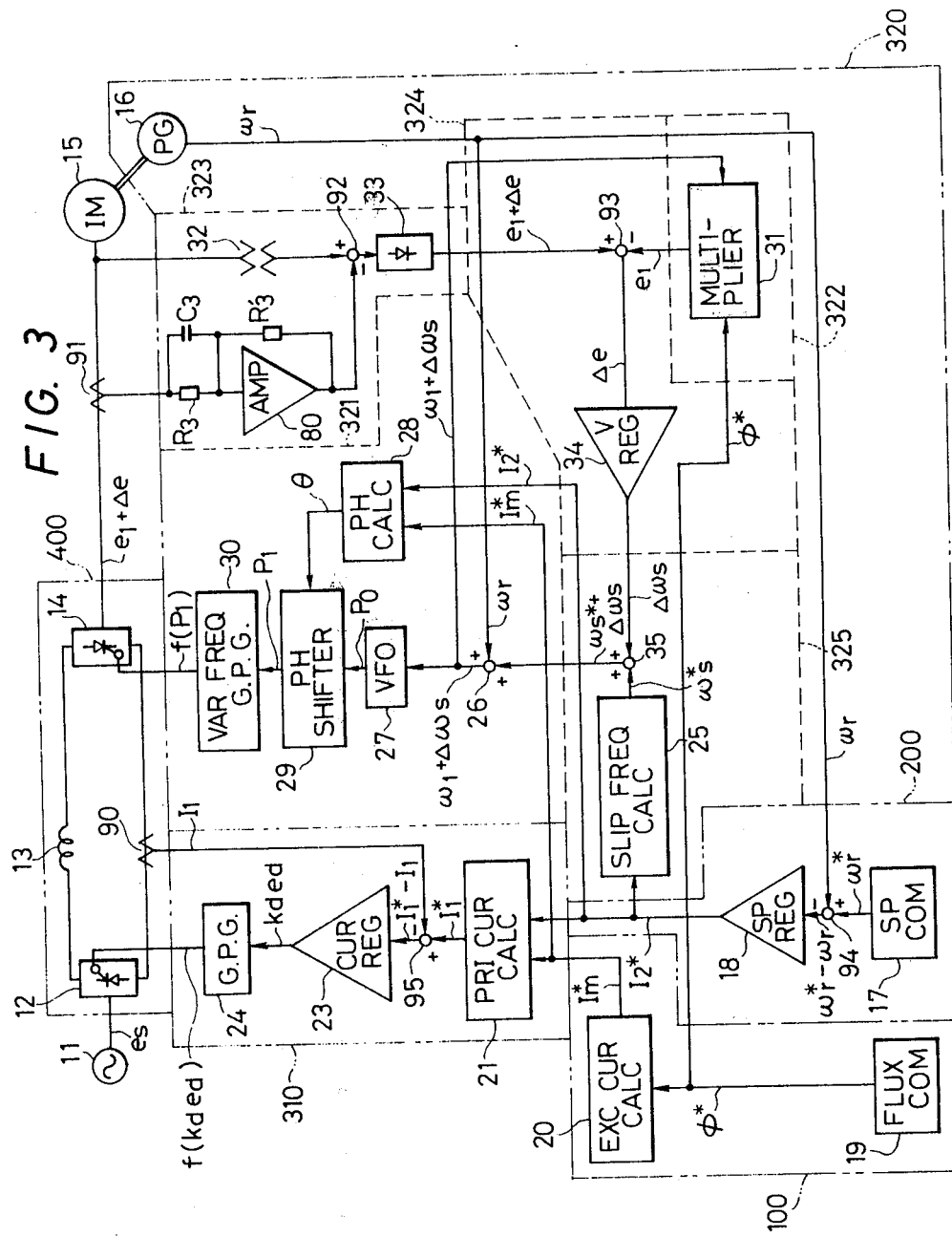
FIG. 3 is a circuit diagram of one embodiment of the control apparatus of the present invention, which comprises means for correcting the change of the slip frequency caused by the change of the secondary resistance of the induction motor.

Referring to FIG. 3, the electric control apparatus of an induction motor 15 according to the present invention comprises a flux current controller 100 for controlling the exciting current Im* of the induction motor 15, a secondary current controller 200 for controlling a secondary current I2* of the induction motor, pulse generator circuits 310 and 320 for controlling the amplitude, frequency W1 and phase angle $\theta$ of a primary current I1 of the induction motor 15, and a frequency converter 400 for controlling the primary voltage and frequency applied to the induction motor 15 according to pulse signals from the pulse generator circuits.

The flux current controller 100 comprises a flux command (hereinafter referred to as "FLUX COM") 19 for giving instructions of the secondary linkage flux and an exciting current calculator (hereinafter referred to as "EXC CUR CALC") 20 for calculating the amplitude of the exciting current Im* of the induction motor (hereinafter referred to as "IM") 15 from an output signal $\phi^*$ of the FLUX COM 19.

The secondary current controller 200 comprises a speed command (hereinafter called "SP COM") 17 and a speed regulator (hereinafter called "SP REG") 18 which is operated according to the deviation between an output signal $W_r^*$ of the SP COM 17 and an output signal $W_r$ of a pilot generator (hereinafter referred to as "PG") 16.

The pulse generator circuits include a control circuit 310 for controlling a converter 12 of the frequency converter 400 and another control circuit 320 for controlling an inverter 14 of the frequency converter 400.

The frequency converter 400 comprises the converter 12, the inverter 14 and a DC reactor 13 for inhibiting pulsation in a direct current flowing in the main circuit.

The control circuit 310 comprises a primary current calculator (hereinafter called "PRI CUR CALC") 21 for calculating the primary current $I_1^*$ to be fed to the induction motor 15 based on the output signal $I_m^*$ of EXC CUR CALC 20, a current regulator (hereinafter referred to as "CUR REG") 23 which is operated according to a signal of the deviation $I_1^*-I_1$ between the output signal $I_1^*$ of PRI CUR CALC 21 and the output signal $I_1$ of the current transformer 90 for detecting the direct current flowing in the main circuit of the frequency converter 400 and a gate pulse generator (hereinafter referred to as "G.P.G.") 24 for feeding a phase trigger signal $f(kd.ed)$ corresponding to an output signal $kd.ed$ of CUR REG 23 to a thyristor of the converter 12. Incidentally, $kd$ indicates a constant and $ed$ indicates a direct current voltage of the converter 12. As described hereinafter, this control circuit 310 is disposed to convert the output for controlling the amplitude of the primary current $I_1$ of IM 15 to a pulse and put out this pulse signal.

The control circuit 320 comprises a control circuit 321 for converting the output for controlling the frequency $\omega_1$ and phase angle $\theta$ of IM 15 to a pulse and putting out a pulse signal, a primary voltage setting zone 322 for setting the primary voltage of IM 15, a primary voltage detecting zone 323 for detecting the primary voltage of IM 15, a slip frequency change ($\Delta\omega_s$) controlling zone 324 including a voltage regulator (hereinafter called "V REG") 34 for determining the deviation between the output voltage $e_1$ of the primary voltage setting zone 322 and the output voltage $e_1 + \Delta e$ of the primary voltage detecting zone 323 and putting out the change $\Delta\omega_s$ of the slip frequency of IM 15 based on the deviation value $\Delta e$, and a correcting controlling zone 325 for correcting the frequency $\omega_1$, one of the objects of the control by the control circuit 321, according to the output signal $\Delta\omega_s$ of the slip frequency change ($\Delta\omega_s$) controlling zone 324.

As described in detail hereinafter, the control circuit 321 comprises an adder 26 for adding the output signal $\omega_s^* + \Delta\omega_s$ of the correcting controlling zone 325 to the output signal $W_r$ of PG 16, a variable frequency oscillator (hereinafter referred to as "VFO") 27 for generating a sin wave signal of a frequency proportional to the output signal $\omega_1 + \Delta\omega_s$ of the adder 26, a phase calculator (hereinafter referred to as "PH CALC") 28 for calculating the phase angle $\theta$ of the primary current of IM 15 from the output signal $I_m^*$ of the flux current controller 100 and the output signal $I_2^*$ of the secondary current controller 200, a phase shifter (hereinafter referred to as "PH SHIFTER") 29 for shifting the phase of the sin wave output signal $P_o$ of VFO 27 according to the output signal of PH CALC 28 and a variable frequency gate pulse generator (hereinafter referred to as "VAR FREQ G.P.G.") 30 for feeding in succession trigger signals $f(P_1)$ to the thyristor of the inverter 14 according to the output signal $P_1$ of PH SHIFTER 29.

The primary voltage setting zone 322 includes a multiplier for multiplying the output signal $\phi^*$ of FLUX COM 19 by the output signal $\omega_1 + \Delta\omega_s$ of the adder 26.

The primary voltage detecting zone 323 comprises a potential transformer 32 for insulating the main circuit of the frequency converter 400 and the control circuit of the present invention from each other to take out an alternating current voltage, a primary impedance compensating circuit connected to a current transformer 91 formed in the main circuit of the frequency converter 400 to take out the primary impedance compensating circuit, which includes resistors $R_3$ and $R_3'$, a condenser $C_3$ and an amplifier (hereinafter called "AMP") 80, a subtractor 92 for subtracting the output of the primary impedance compensating circuit from the output of the potential transformer 32, and a voltage detector 33 for rectifying the output signal of the subtractor 92 and detecting the amplitude of the alternating current voltage.

The $\Delta\omega_s$ controlling zone 324 includes a subtractor 93 for subtracting the output $e_1$ of the multiplier 31 from the output $e_1 + \Delta e$ of the voltage detector 33 and V REG 34.

The correcting controlling zone 325 includes a slip frequency calculator (hereinafter referred to as "SLIP FREQ CALC") 25 for calculating the slip frequency $\omega_s^*$ of IM 15 based on the output signal $I_2^*$ of SP REG 18 and an adder 35 for adding the output signal $\Delta\omega_s$ of V REG 34.

The operation of the circuit shown in FIG. 3 will now be described.

Supposing that the exciting inductance is represented by M, EXC CUR CALC 20 puts out a signal of $I_m^* = \phi^*/M$. Supposing that the gain of SP REG 18 is represented by $Gr$, SP REG 18 puts out a signal of $I_2^* = Gr(\omega_r^* - \omega_r)$.

The following relation is established among the primary current command $I_1^*$, secondary current command $I_2^*$ and exciting current command $I_m^*$ of IM 15:

$$I_1^* = \sqrt{(I_2^*)^2 + (I_m^*)^2} \tag{1}$$

PRI CUR CALC 21 performs the calculation according to this formula (1) and puts out the primary current command signal $I_1^*$.

Supposing that the gain of CUR REG 23 is represented by $Gc$, CUR REG 23 puts out a signal of $Kd.ed = Gc(I_1^* - I_1)$.

G.P.G. 24 compares the output $ed$ of the power source 11 with the output signal $kd.ed$ of CUR REG 23 and puts out a trigger signal $f(kd.ed)$ to the thyristor of the converter 12, whereby the output voltage of the converter 12 is controlled, and a direct current proportional to the primary current command $I_1^*$ is obtained by the smoothing action of the DC reactor 13.

The primary frequency $\omega_1$ of IM 15 is given in the following manner.

The following relation is established between the slip frequency $\omega_s$ and secondary current I2 of IM 15:

$$\omega_s = KR_2I_2 = \left(\frac{M}{M+L_2'}\right)\frac{R_2I_2}{\phi} \quad (2)$$

wherein $R_2$ stands for the secondary resistance, k is a constant, M represents the exciting inductance of IM 15, $L_2'$ stands for the secondary leak inductance of IM 15 and $\phi$ stands for the secondary linkage flux of IM 15.

Accordingly, SLIP FREQ CALC 25 makes the following calculation and generates the slip frequency command $\omega_s^*$:

$$\omega_s^* = KI_2^* \quad (3)$$

$$(K \propto R_2)$$

Namely, SLIP FREQ CALC 25 puts out the slip frequency command $\omega_s^*$ as a signal proportional to the instructed secondary current $I_2^*$.

For simplification of the illustration, the operation of the circuit shown in FIG. 3 will now be described without referring to the primary voltage setting zone 322, primary voltage detecting zone 323 and $\Delta\omega_2$ controlling zone 324, which constitute characteristic parts of the present invention.

The following relation is established among the primary frequency $\omega_1$, electric rotation frequency $\omega_r$ and slip frequency $\omega_s$ of IM 15:

$$W_1 = \omega_r + \omega_s \quad (4)$$

The adder 26 performs the calculation according to the formula (4) and generates a primary frequency instruction signal $\omega_1$. The output signal Po of VFO is a sin wave signal of a frequency proportional to the primary frequency instruction signal $\omega_1$. The signal Po of one phase of this sin wave signal is expressed as follows:

$$P_o = P\text{SiN}(\omega_1^* t) \quad (5)$$

wherein P is a constant.

PH CALC 28 performs the calculation according to the following formula (6) and puts out the phase angle $\theta^*$ between the secondary current $I_2^*$ and the exciting current $I_m^*$:

$$\theta^* = \tan^{-1}\left(\frac{I_2^*}{I_m^*}\right) \quad (6)$$

PH SHIFTER 29 shifts the phase of the output signal Po represented by the formula (5) by the phase angle $\theta^*$ and puts out a signal P1 represented by the following formula (7) for instructing the primary frequency:

$$P_1 = P\sin(W_1^* t + \theta^*) \quad (7)$$

VAR FREQ G.P.G. 30 triggers the thyristor of the inverter 14 by the output f(P1) proportional to P1, whereby the output frequency of the inverter 14 is controlled as expressed by the formula (7).

If the amplitude and frequency of the primary current are controlled in the above-mentioned manner, the secondary current $I_2^*$ and exciting current $I_m^*$ of IM 15 can be vectorially controlled independently. Accordingly, the secondary current $I_2^*$ is controlled depending on the desired torque and the exciting current $I_m^*$ is controlled depending on the set flux, with the result that the rotation speed of IM 15 can be adjusted exactly to the instructed speed.

The above-mentioned control method, however, involves the following problem because changes of the secondary resistance are not taken into account. The resistance value of the secondary resistor varies remarkably according to such factors as the load and ambient temperature and the degree of the variation is as large as 40 to 50%. As is seen from the formula (2), the slip frequency $\omega_s$ is proportional to the value of the secondary resistance $R_2$. Accordingly, if the value of the secondary resistance $R_2$ is changed, it is necessary to change the proportion constant k of the formula (3) so as to change the slip frequency command signal $\omega_s^*$. In the above-mentioned control method, since changes of the secondary resistance $R_2$ are not taken into account, the slip frequency command signal $\omega_s^*$ cannot be controlled to a correct value proportional to the secondary current command signal $I_2^*$. Therefore, in the above-mentioned control method, a problem arises as regards changes of the voltage or torque in IM 15.

The reason will now be described with reference to FIGS. 1 and 2.

Figure 1:
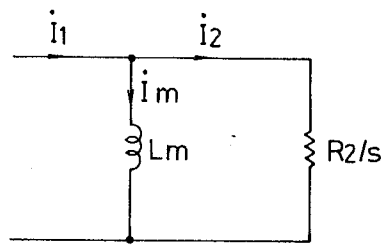
FIG. 1 is an equivalent circuit diagram of a cage type induction motor.

If the primary and secondary leakage inductances are neglected for the purpose of simplification, the equivalent circuit of IM 15 may be shown in FIG. 1. In FIG. 1, $L_m$ stands for the exciting inductance, $R_2$ designates the secondary resistor, s indicates the slip, and $\dot{I}_1$, $\dot{I}_2$ and $\dot{I}_m$ represent the primary current, secondary current and exciting current, respectively. The relation among $\dot{I}_1$, $\dot{I}_2$ and $\dot{I}_m$ may be vectorially shown as in FIG. 2.

Referring to FIG. 1, the amplitude of the primary current $\dot{I}_1$ is determined by the output signal $I_1^*$ of PRI CUR CALC 21, and the phase angle $\theta$ in the normal state is determined by the output signal of PH CALC 28.

The vector of $\dot{I}_1$ obtained when the actual secondary resistance $R_2$ is equal to the preset secondary resistance $R_2$ is expressed as OA.

Figure 2:
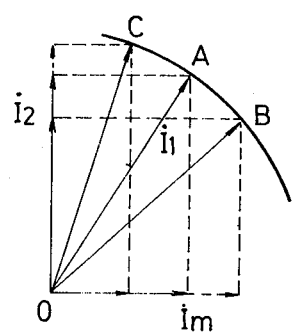
FIG. 2 is a diagram illustrating the principle of the field oriented control apparatus to which the present invention is applied.

If the actual secondary resistance $R_2$ is changed, the amplitude of the primary current $\dot{I}_1$ is equal to OA shown in FIG. 2 when $I_m^*$ and $\dot{I}_2^*$ are constant.

If the secondary resistance $R_2$ is increased in the above-mentioned case, as is seen from the equivalent circuit shown in FIG. 1, $\dot{I}_2$ is decreased but $\dot{I}_m$ is increased, and the vector of $I_1$ is changed as expressed by OB in FIG. 2. Therefore, the primary voltage applied to the exciting inductance Lm is increased and in the embodiment shown in FIG. 2, the output torque is increased. On the other hand, when the actual secondary resistance $R_2$ is decreased, the secondary current $\dot{I}_2$ is increased and the exciting current $\dot{I}_m$ is decreased, and the vector of the primary current is changed as indicated by OC in FIG. 2. Therefore, the primary voltage is reduced and the output torque is reduced in the embodiment shown in FIG. 2.

In the foregoing manner, the primary voltage and output torque of IM 15 are changed according to the change of the secondary resistance $R_2$. In the above-mentioned control method where changes of the secondary resistance caused with changes of $I_2^*$ are not taken into account, the change of the frequency of the torque is as large as several seconds though this value differs to some extent depending on the size and capacity of IM 15, with the result that it becomes impossible to maintain the response capacity of IM 15 at a level equivalent to the response capacity of a DC motor.

In accordance with the present invention, the above defect is eliminated by providing a circuit for compensating the change of the secondary resistance of IM 15, as described in detail hereinafter.

More specifically, according to the present invention, as means for compensating the change of the secondary resistance of IM 15, there are provided a circuit 322 for setting the primary voltage, a primary voltage detecting zone 323, $\Delta\omega_s$ controlling zone 324 and a correcting controlling zone 325.

In this structure according to the present invention, the change of the secondary resistance $R_2$ is compensated in the following manner.

The set value of the primary voltage is given by the product of the flux command $\phi^*$ emitted from FLUX COM 19 and the sum of the primary frequency $W_1$ and the slip frequency change $\Delta\omega$, that is, by $\phi^* \times (\omega_1 + \Delta\omega)$. The multiplier 31 makes this calculation and puts out the set value $e_1$ of the primary voltage. V REG 34 picks up the deviation between the output signals of the voltage detector 33 and the multiplier 31 and puts out a signal for correcting the command from SP COM 17 so that the secondary resistance $R_2$ is corrected when it is different from the value set by SLIP FREQ CALC 25. More specifically, when the secondary resistance $R_2$ is increased, the primary voltage of IM 15 is increased, and therefore, the output of the voltage detector 33 is elevated to $e_1 + \Delta e$. At this point, the output signal of the multiplier 31 is $e_1$. The subtractor 93 makes the calculation of $(e_1 + \Delta e) - (e_1)$, and puts out the signal of $\Delta e$. V REG 34 puts out the signal of $\Delta\omega_s = Gv\Delta e$ where Gv indicates the gain of V REG 34 and $\Delta\omega_s$ represents the output of V REG 34.

The adder 35 adds the output $\omega_s^*$ of SLIP FREQ CALC 25 to the output $\Delta\omega_s$ of V REG 34 and puts out a signal of the value of $\omega_s^* + \Delta\omega_s$ to the adder 26. Accordingly, the adder 35 can correct the slip frequency $\omega_s^*$ according to the change of the secondary resistance.

On the other hand, when the second resistance $R_2$ is decreased, V REG 34 puts out a correcting signal for reducing the slip frequency. Accordingly, supposing that the decrease of the slip frequency is expressed as $-\Delta\omega_s$, the adder 35 puts out a signal of the value equal to $\omega_s^* - \Delta\omega_s$ to the adder 26.

If the slip frequency $\omega_s^*$ is corrected according to the deviation between the set value of the primary voltage and the detected value of the primary voltage in the foregoing manner, the change of the secondary resistance can easily be corrected without adopting a complicated correcting method, for example, a method in which the secondary resistance is directly measured and the change thereof is compensated.

According to the present invention, the change of the torque can be reduced to zero, and furthermore, since the output torque is compensated depending on the change of the secondary resistance of IM 15, the capacities of the frequency converter 400 and IM 15 need not be increased.

In the foregoing illustration, the primary leakage impedance of IM 15 is neglected and the primary voltage is regarded as a signal proportional to the induced voltage of IM 15. As will be apparent to those skilled in the art, if the voltage drop by the primary leakage impedance is large, the primary impedance drop should be compensated.

The circuit for compensating this primary impedance drop comprises amplifier 80, resistors $R_3$ and $R_3'$ condenser $C_3$ and subtractor 92. Supposing that the resistance of the primary leakage impedance is expressed as $R_1$ and the inductance is expressed as $L_1$, in order to compensate the above-mentioned primary leakage impedance, requirements of $R_1 = R'/R$ and $L_1 = R'C$ should be satisfied.

Figure 4:
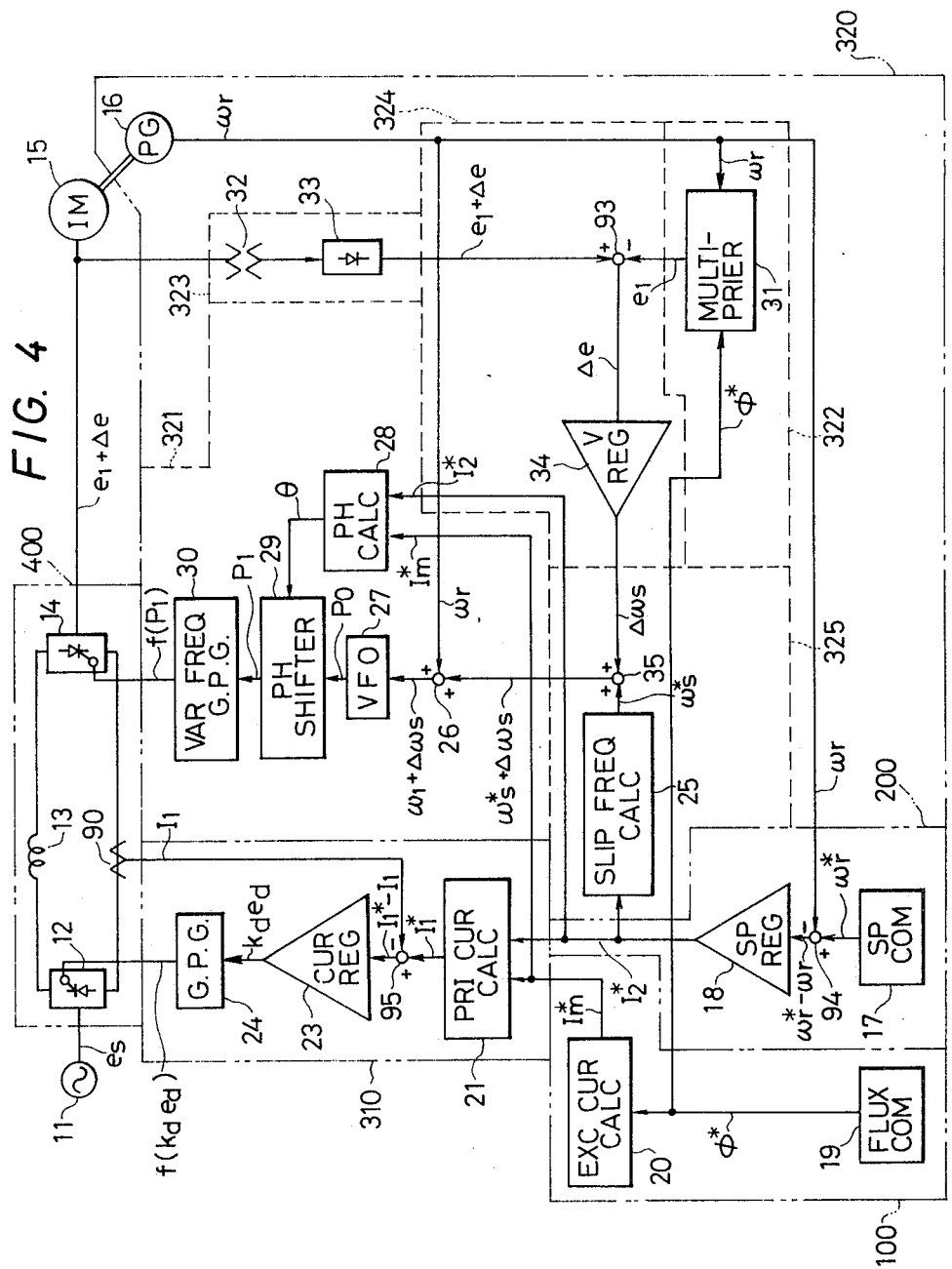
FIG. 4 is a circuit diagram of one modification of the apparatus shown in FIG. 3, in which a relation of $\omega_s < < \omega_r$ is established between the slip frequency $\omega_s$ of the induction motor and the electric rotation frequency $\omega_r$.

FIG. 4 shows one modification of the circuit shown in FIG. 3. In FIG. 4, the same reference numerals and symbols in FIG. 3 represent the same members and contents as in FIG. 3. The circuit of FIG. 4 is different from the circuit of FIG. 3 only in the point where in the circuit of FIG. 4, one input of the multiplier 31 is the electric rotation frequency $\omega_r$ of PG 16 while in the circuit of FIG. 3, this input is the output $\omega_1 = \Delta\omega_s$ of the adder 26. The circuit structure shown in FIG. 4 is effective when the relation of $\omega_s < <\omega_r$ is established. In the circuit shown in FIG. 4, a circuit for compensating the voltage drop by the primary leakage impedance is not formed, but in this circuit shown in FIG. 4 and circuits described hereinafter, this compensating circuit may be formed according to need.

Figure 5:
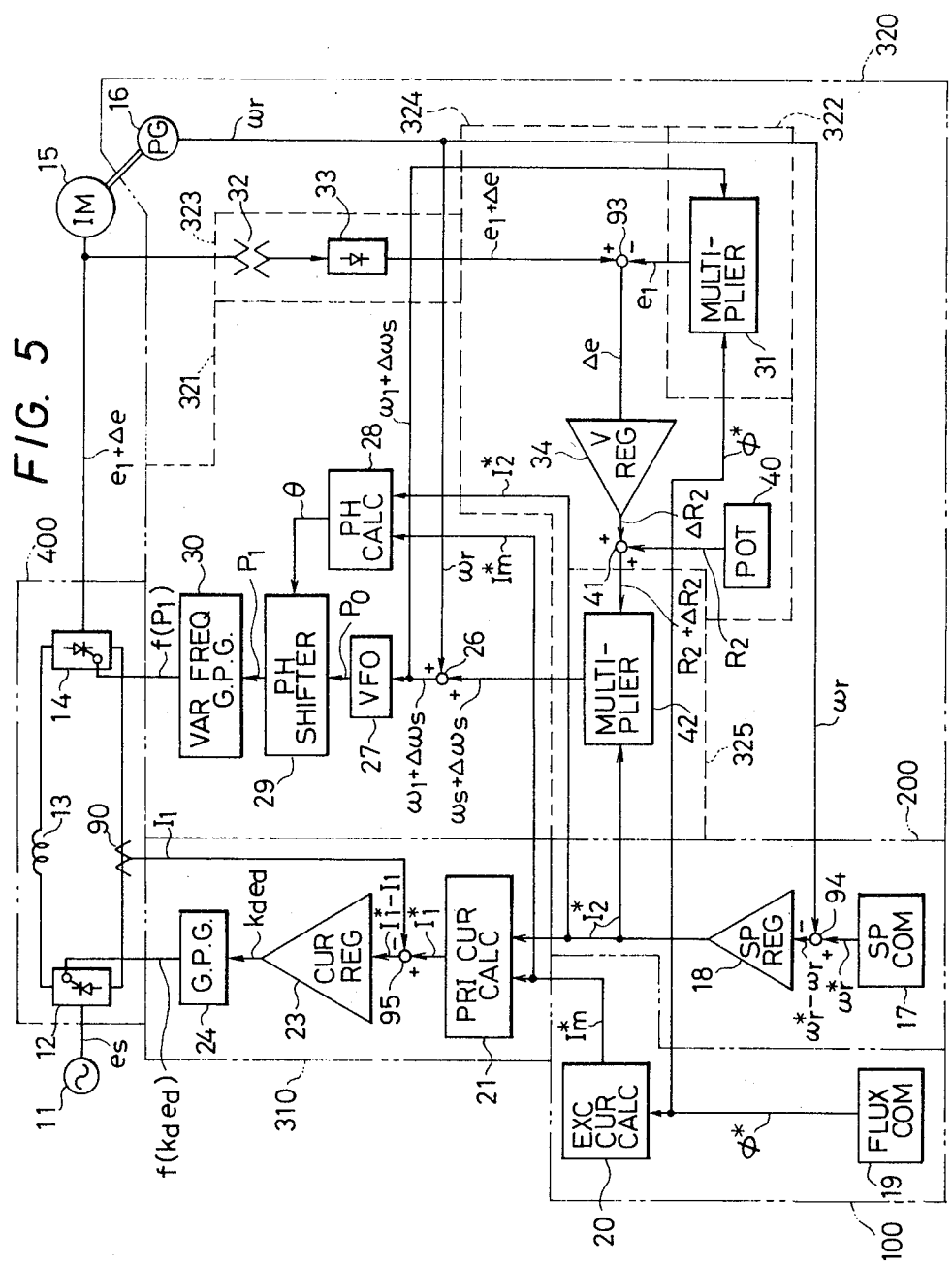
FIG. 5 is a circuit diagram of another embodiment of the control apparatus of the present invention, which comprises means for correcting the change of the secondary resistance of the induction motor.

FIG. 5 illustrates a circuit which is constructed so that $\Delta\omega_s$ is added to the slip frequency $\omega_s$ based on the concept that when the secondary resistance $R_2$ of IM 15 is changed to $R_2 + \Delta R_2$, the slip frequency is changed to $\omega_s + \Delta\omega_s$.

In FIG. 5, the same reference numerals and symbols as in FIG. 3 represent the same members and contents as in FIG. 3.

Supposing that the gain of V REG 34 is expressed as GV and the input from the subtractor 93 is expressed as $\Delta e$, V REG 34 puts out a signal of the value of $\Delta R_2 = Gv\Delta e$, which is proportional to the change of the secondary resistance. Reference numeral 40 represents a potentiometer (hereinafter called "POT") 40 for setting a value proportional to the secondary resistance $R_2$ of IM 15. An adder 41 adds the output $R_2$ from POT 40 to the output $\Delta R_2$ from V REG 34 and puts out a signal of the value of $R_2 + \Delta R_2$. Supposing that when the secondary resistance $R_2$ is changed to $R_2 + \Delta R_2$, the slip frequency $\omega_s$ is changed to $\omega_s + \Delta\omega_s$, a relation represented by the following formula (8) is established between $R_2 + \Delta R_2$ and $\omega_s + \Delta\omega_s$:

$$(\omega_s + \Delta\omega_s) = k(R_2 + \Delta R_2)I_2 \qquad (8)$$

A multiplier 42 utilizes the relation of the formula (8), calculates the product of the output $R_2 + \Delta R_2$ of the adder 41 and the output $I_2^*$ of SP REG 18 and puts out a signal of the value of $\omega_s + \Delta\omega_s = k(R_2 + \Delta R_2)I_2^*$. Other operations are the same as in the circuit shown in FIG. 3. Ordinarily, POT 40 is built in the control circuit of the present invention. Accordingly, unlike the secondary resistance of IM 15, this POT 40 is not directly influenced by the ambient temperature or the like.

Figure 6:
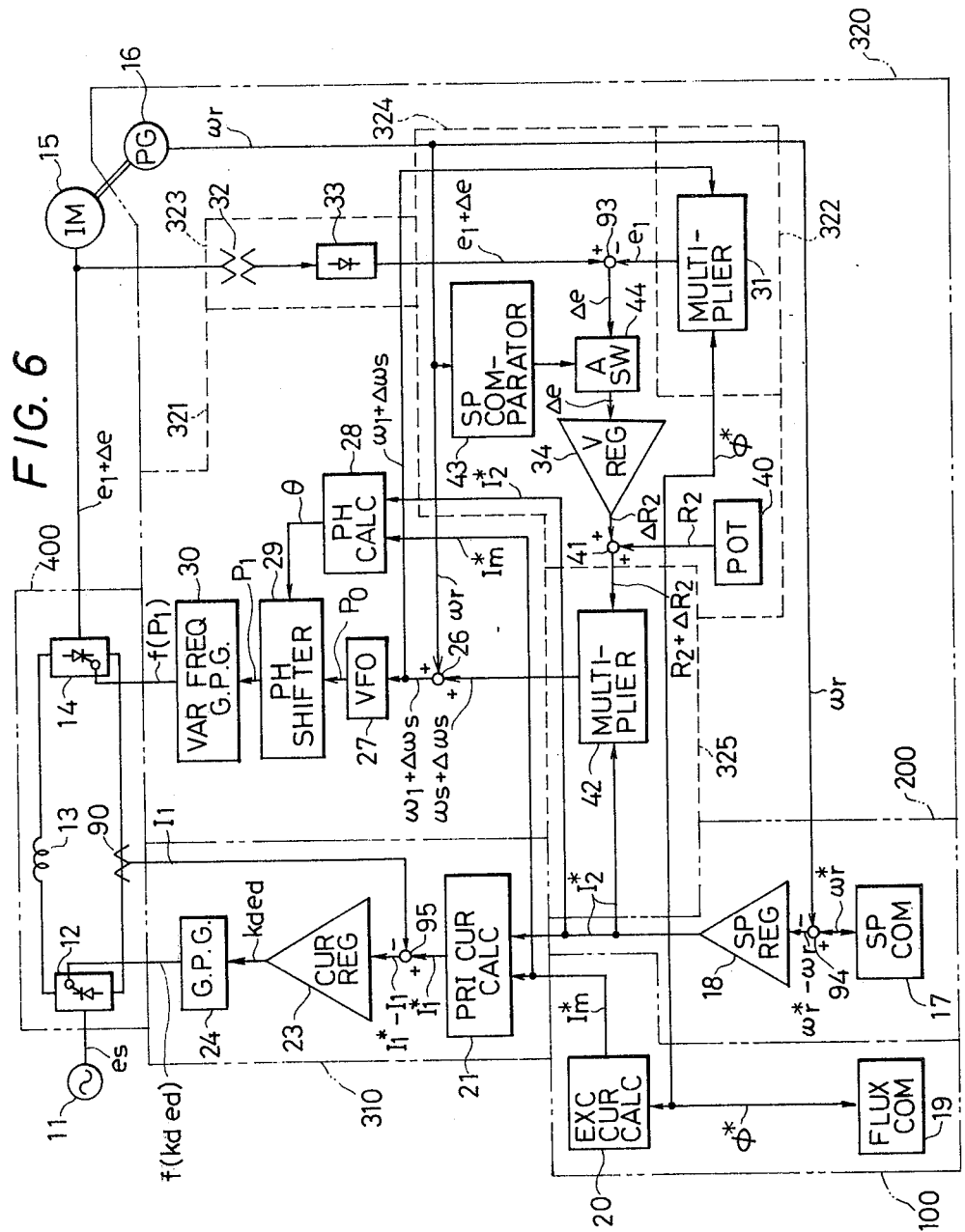
FIG. 6 is a circuit diagram of still another embodiment of the control apparatus of an induction motor according to the present invention, by which the induction motor can be stably operated from the low speed without any influence of changes of the secondary resistance of the induction motor.

FIG. 6 illustrates a modification of the circuit shown in FIG. 5. In FIG. 6, the same reference numerals and symbols as in FIG. 5 represent the same members and contents as in FIG. 5.

The circuit of FIG. 6 is different from the circuit shown in FIG. 5 in the point where a speed comparator (hereinafter called "SP COMPARATOR") 43 and an analog switch (hereinafter called "A SW") 44 are arranged in the circuit of FIG. 6.

SP COMPARATOR 43 is disposed to discriminate the rotation speed of IM 15. A signal put into SP COM- PARATOR 43 is put out from PG 16. A SW 44 is on-off controlled by the output signal of SP COMPARATOR 43. A SW 44 is an analog gate which is put on and off by output signals of SP COMPARATOR 43. More specifically, A SW 44 is put off when the rotation speed is extremely low but A SW 44 is put on when the rotation speed is higher than the above extremely low speed.

When the rotation speed is extremely low, the primary frequency of IM 15 is drastically reduced, and therefore, the transformer 32 becomes saturated and it is difficult to detect a correct value of the voltage. In such extremely low speed region, A SW 44 is put off by the output of SP COMPARATOR 43, and the input signal of V REG 34 is put off. By this arrangement, the influence of errors in detection of the voltage can be eliminated. In this embodiment, if V REG 34 is constructed by an amplifier including an integrating element, even when the input signal is reduced to zero, the signal corresponding to the change of the secondary resistance of IM 15 is retained, and therefore, a signal corresponding to the retained secondary resistance is put out from the adder 41. Accordingly, even when the rotation speed is extremely low, the slip frequency $\omega_s^* + \Delta\omega_s$ corresponding to the change of the secondary resistance $R_2$ is put out from the multiplier 42.

When the rotation speed of IM 15 is other than the above-mentioned extremely low speed, the circuit shown in FIG. 6 is operated in the same manner as described hereinbefore with respect to the circuit shown in FIG. 5.

When the circuit shown in FIG. 6 is adopted, the operation can be performed at predetermined voltage and torque irrespectively of the rotation speed, that is, in the rage of from an extremely low speed to a very high speed.

Figure 7:
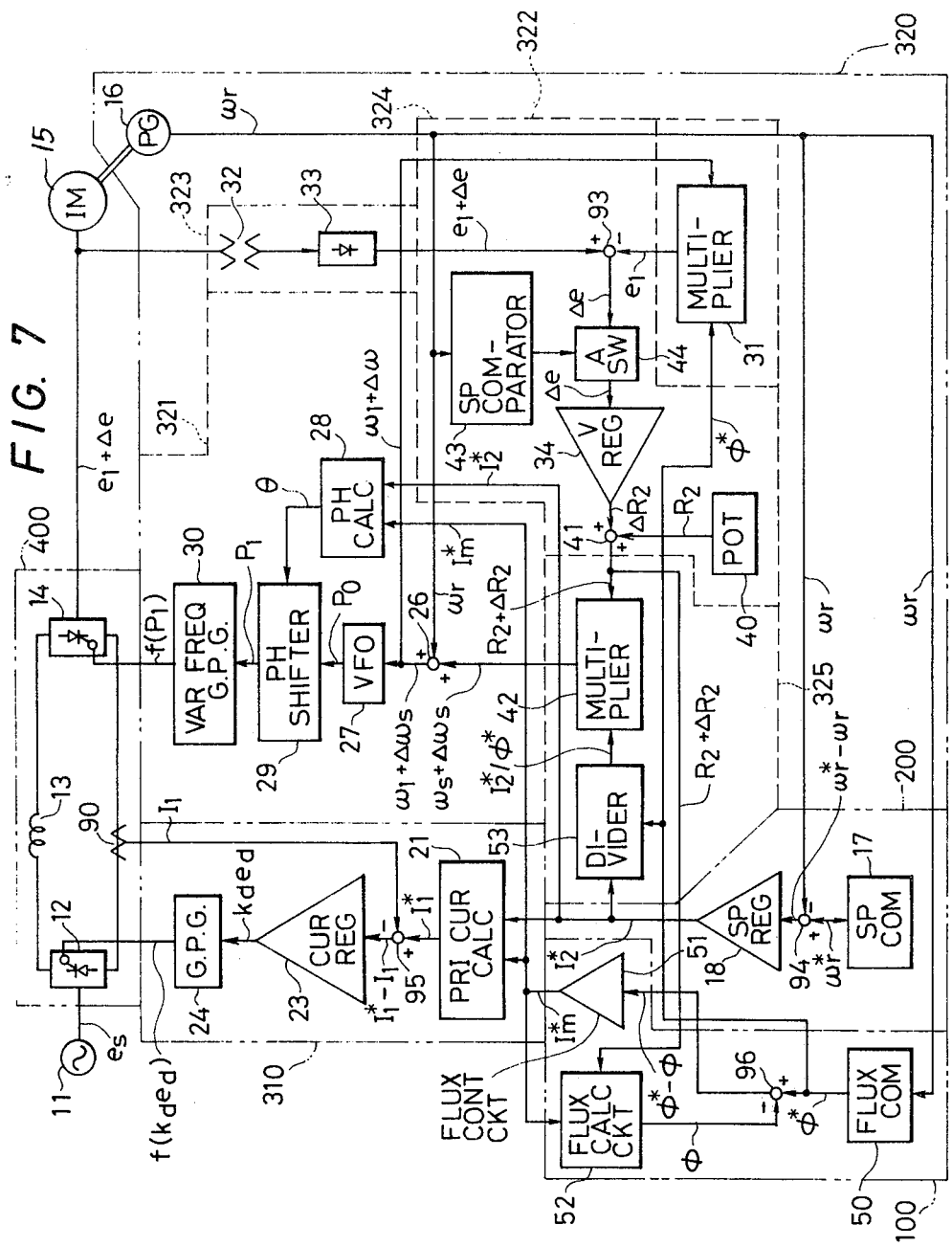
FIG. 7 is a circuit diagram of still another embodiment of the control apparatus of an induction motor according to the present invention, in which the flux weakening control can be performed without any influence of changes of the secondary resistance of the induction motor.

FIG. 7 is a circuit diagram illustrating still another embodiment of the present invention, in which control corresponding to weak field control of a DC motor is carried out.

In FIG. 7, the same reference numerals and symbols as in FIG. 6 represent the same members and contents as in FIG. 6.

The circuit shown in FIG. 7 is different from the circuit shown in FIG. 6 in the structures of the flux current controller 100 and correcting controlling zone 325.

In the circuit shown in FIG. 7, FLUX COM 50 is a flux command circuit for instructing the secondary leakage flux $\phi^*$ to IM 15 according to the electric rotation frequency $\omega_r$ of IM 15 and reduces flux $\phi^*$ in inverse proportion to the electric rotation frequency $\omega_r$ in the high speed region. Accordingly, FLUX COM 50 stores the $\omega_r - \phi^*$ characteristic required for feeding out a constant output type load torque and puts out flux $\phi^*$ corresponding to the output $W_r$ from PG 16. A flux control circuit (hereinafter referred to as "FLUX CONT CKT") 51 acts according to the signal of deviation $\phi^* - \phi$ between the output $\phi^*$ of FLUX COM 50 and the output $\phi$ of a flux calculating circuit (hereinafter referred to as "FLUX CALC CKT") 52, and the output of FLUX CONT CKT 51 is a signal for instructing the exciting current Im* of IM 15. Supposing that the gain of FLUX CONT CKT 51 is expressed as Gf, the output Im* is given by the formula Im* = Gf($\phi^* - \phi$). FLUX CALC CKT 52 is a circuit for calculating the secondary leakage flux $\phi$ of IM 15 from the output signal of FLUX CONT CKT according to the following formula:

$$\phi = \frac{K'}{1 + Ts} Im^* \qquad (9)$$

wherein K' is a constant, T is a secondary circuit time constant ($\infty 1/R_2$) of IM 15 and s is a differential operator.

Figure 8:
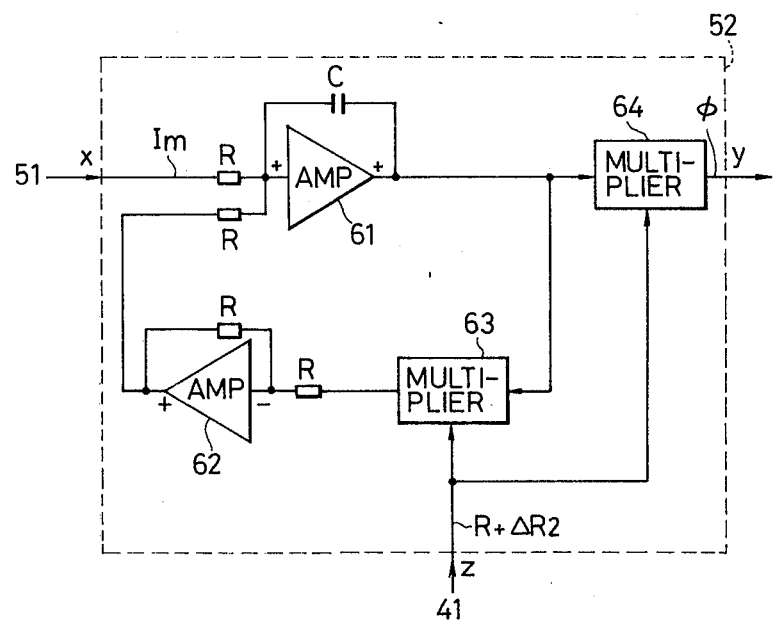
FIG. 8 is a circuit diagram of one instance of the flux control circuit in the circuit diagram of FIG. 7.

FIG. 8 is a diagram illustrating one instance of the specific structure of FLUX CALC CKT 52. In FIG. 8, 51 and 52 represent an amplifier, 63 and 64 represent a multiplier, and R and C represents a resistor and a condenser, respectively. The relation among x, y and z in FIG. 8 is represented by the following formula (10):

$$y = \frac{1}{a + \frac{CR}{z}s} x \qquad (10)$$

If x, y and z are replaced by Im* in the formula (9), $\phi$ in the formula (9) and the secondary resistance $R_2$, the time constant (CR/Z) for operation varies in inverse proportion to z, that is, the secondary resistance. Accordingly, if the structure shown in FIG. 8 is adopted, the operation of the formula (9) can be performed by the time constant T corresponding to the change of the secondary resistance $R_2$.

If the exciting current Im* is calculated by subtracting the secondary leakage flux $\phi$ given by the formula (9) from the output $\phi^*$ of FLUX COM 50, the delay of the secondary leakage flux $\phi$ which causes a problem at the flux weakening control can be compensated in advance.

As is seen from the above-mentioned formula (2), the slip frequency $\omega_s$ is in proportion to $I_2/\phi$. At the flux weakening control, the secondary leakage flux $\phi^*$ is controlled in FLUX COM 50 according to the value of the slip frequency $\omega_r$. Accordingly, a device 53 for calculating $I_2^*/\phi^*$ for correcting the secondary current put in the multiplier 42 is inserted in the former stage of the secondary current input terminal of the multiplier 42.

Figure 9:
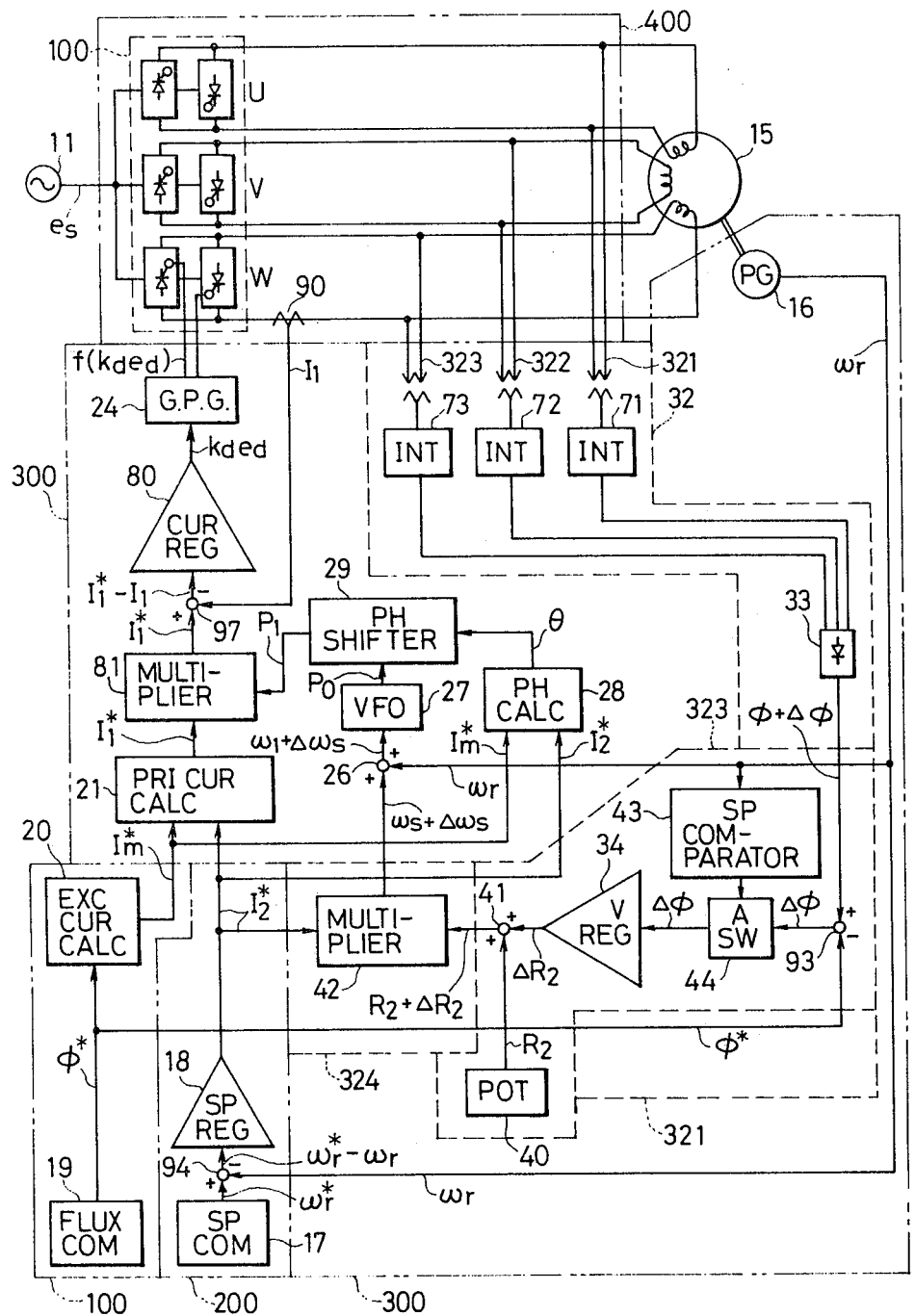
FIG. 9 is a circuit diagram of still another embodiment of the control apparatus of the present invention which is applied to a cycloconverter.

In the embodiments illustrated hereinbefore, a current type inverter is used as the frequency converter. The present invention can also be applied to the system where a PWM inverter or cycloconverter is used as the frequency inverter. FIG. 9 illustrates an embodiment wherein the present invention is applied to a cycloconverter 100.

In FIG. 9, the same reference numerals and symbols as in FIG. 6 represent the same members and contents as in FIG. 6. The embodiment shown in FIG. 9 is different from the embodiment shown in FIG. 6 mainly in the point where in FIG. 6, the pulse generator circuit is constructed by control circuits 310 and 320, while in FIG. 9, the pulse generator circuit is constructed by a single control circuit 300. In the pulse generator circuit of FIG. 9, members represented by the same reference numeral and symbols as used in FIG. 6 exert the same functions as those of the members in FIG. 6.

In FIG. 9, reference numerals 71, 72 and 73 represent integrators for integrating voltages detected by transformers 321, 322 and 323 and calculating the instantaneous value of the flux. Each of these integrators 71, 72 and 73 acts as a noise filter for the input signal. Accordingly, a noise-free signal of the primary voltage can be obtained. Also in this embodiment, the circuit for compensating the primary impedance drop of IM 15, described hereinbefore with reference to FIG. 3, may be disposed according to need. A subtractor 93 puts out a signal obtained by subtracting the output $\phi^*$ of FLUX COM 19 from the output $\phi+\Delta\phi$ of the voltage detector 33.

Supposing that the gain of V REG 34 is expressed as Gv, V REG 34 puts out a signal of $\Delta R_2 = Gv\Delta\phi$. Since $\Delta\phi$ is a noise-free signal, a signal proportional to the change of the secondary resistance, which is not influenced by noises, can be taken out from V REG 34. Accordingly, especially good effects can be obtained when many high-frequency waves by commutation in the thyristor of the converter are contained in the primary voltage of IM 15.

What is claimed is:

1. An electric control apparatus for an induction motor comprising
    flux current controller means producing a signal for controlling the exciting current of the induction motor in accordance with a flux command;
    secondary current controller means producing a signal for controlling the secondary current of the motor in accordance with a speed command;
    pulse generator means for producing outputs for controlling the amplitude, frequency and phase angle of the primary current of the motor in the form of pulse signals according to the output signals of said flux current controller means and said secondary current controller means;
    frequency converter means for controlling the voltage and frequency to be applied to the motor according to the pulse signals from said pulse generator means;
    primary voltage setting means responsive to said flux command for setting the primary voltage of the motor, primary voltage detecting means for detecting the primary voltage of the motor, voltage regulator means for putting out a signal having a value equivalent to the change of the secondary resistance of the motor according to the difference between the output of said primary voltage detecting means and the output of said primary voltage setting means, and correcting controlling means connected to said pulse generator means for correcting the output for controlling said frequency of the primary current of the motor according to a signal proportional to slip frequency derived from the output signal of said secondary current controller means and a signal proportional to slip frequency change derived from the output signal of said voltage regulator means.

2. An electric control apparatus for an induction motor according to claim 1 wherein said primary voltage setting means includes multiplier means for integrating the output signal of said flux current controller means with the output signal of the pulse generator means for controlling the frequency of the primary current of the motor.

3. An electric control apparatus for an induction motor according to claim 1 wherein said primary voltage setting means includes multiplier means for integrating the output signal of said flux current controller means with an output signal equivalent to the electric rotation frequency of the motor.

4. An electric control apparatus for an induction motor according to claim 1 wherein said primary voltage detecting means includes voltage detector means for obtaining an output signal proportional to the output of said frequency converter means.

5. An electric control apparatus for an induction motor according to claim 1 wherein said primary voltage detecting means includes compensating means connected to the output of said frequency converter means to compensate the primary impedance of the motor and voltage detector means for obtaining a multiplied output signal from the output signal of said compensating means and an output signal proportional to the output of said frequency converter means.

6. An electric control apparatus for an induction motor according to claim 1 wherein said primary voltage setting means produces an output corresponding to the output signal of said flux current controller means, and said primary voltage detecting means includes integrator means for integrating an output signal proportional to the output of said frequency converter means and voltage detector means for detecting the amplitude of the output signal of said integrator means.

7. An electric control apparatus for an induction motor according to claim 1 wherein said voltage regulator means includes means for producing a slip frequency deviation signal equivalent to the change of said secondary resistance of the motor.

8. An electric control apparatus for an induction motor according to claim 1 wherein said voltage regulator means includes adder means for adding the output signal of said voltage regulator means to an output signal equivalent to said secondary resistance of the motor.

9. An electric control apparatus for an induction motor according to claim 1, further including switch means for inhibiting the output of the voltage regulator means when the gain characteristic of the voltage detecting means is non-linear and for passing the output of the voltage regulator means when the gain characteristic of the voltage detecting means is linear.

10. An electric control apparatus for an inductor motor according to claim 1 wherein said correcting controlling means includes slip frequency calculator means for determining the slip frequency from the output of said secondary current controller means and adder means for adding the output of said calculator means to the output signal of the voltage regulator means for producing a slip frequency deviation signal.

11. An electric control apparatus for an inductor motor according to claim 1 wherein said correcting controlling means includes multiplier means for integrating the output signal from said secondary current controller means with an output equivalent to the sum of the secondary resistance and the change of the secondary resistance.

12. An electric control apparatus for an induction motor according to claim 9 wherein said voltage regulator means includes a data storing memory.

* * * * *